United States Patent
Cutlip

(10) Patent No.: US 9,898,530 B2
(45) Date of Patent: Feb. 20, 2018

(54) ONTOLOGY DRIVEN CONTEXTUAL MEDIATION

(75) Inventor: Robert R. Cutlip, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1267 days.

(21) Appl. No.: 11/847,298

(22) Filed: Aug. 29, 2007

(65) Prior Publication Data

US 2009/0064189 A1 Mar. 5, 2009

(51) Int. Cl.
*G06F 3/00* (2006.01)
*G06F 17/30* (2006.01)
*G06F 9/54* (2006.01)

(52) U.S. Cl.
CPC ........ *G06F 17/30734* (2013.01); *G06F 9/542* (2013.01)

(58) Field of Classification Search
CPC ....................................................... G06F 9/542
USPC ......................................................... 719/318
See application file for complete search history.

(56) References Cited

U.S. PATENT DOCUMENTS

2005/0165795 A1* 7/2005 Myka et al. .................. 707/100
2006/0174201 A1* 8/2006 Zaner-Godsey et al. ..... 715/736
2006/0265746 A1* 11/2006 Farley et al. .................... 726/22
2007/0083813 A1* 4/2007 Lui ...................... G06F 11/3612 715/709
2007/0271573 A1* 11/2007 Chandrasekaran ........... 719/318
2008/0052407 A1* 2/2008 Baudino et al. .............. 709/238

OTHER PUBLICATIONS

Bhansali, Towards Ontological Context Mediation for Semantic Web Database Intergration: Translating COIN Ontologies Into OWL, 2004.*
Ning Weng, Pipelining vs. Multiprocessors-Choosing the Right Network Processor System Topology,2004.*
Chalmers, Dan, et al; A Framework for Contextual Mediation in Mobile and Ubiquitous Computing Applied to the Context-aware Adaptation of Maps; Pers Ubiquit Comput (2004) 8:1-18.

* cited by examiner

*Primary Examiner* — Lechi Truong
(74) *Attorney, Agent, or Firm* — Steven M. Greenberg, Esq.; CRGO Law

(57) ABSTRACT

A method for ontologically driving context mediation in a computing system can include collecting events arising from a solution in a computing environment, loading operational meta-data for the solution, contextually mediating, for example context interchange (COIN) mediating, the collected events with the operational meta-data to produce context sensitive events, and correlating the context sensitive events with corresponding symptoms in a display to an end user in the computing environment.

3 Claims, 1 Drawing Sheet

ONTOLOGY DRIVEN CONTEXTUAL MEDIATION

BACKGROUND OF THE INVENTION

Field of the Invention

The present invention relates to the field of context aware computing and more particularly to contextual mediation.

Description of the Related Art

Context aware computing refers to the treatment of the user environment in system behavior. Aspects of context can be wide-ranging and can include computing device and undertaken task. Context can be used to modify data in a computing system in order most appropriately process the data. Examples include adjusting the presentation of data according to context, or adjusting the responsiveness of logic to events according to the context of processed data. Contextual mediation generally relates to the consideration of the contemporaneous context of a transaction in processing the transaction itself.

Generally speaking, the notion of mediation has been proposed as the principle means of resolving semantic inter-operation issues in a computing environment. Mediation architectures often are based upon mediator or wrappers paradigms wherein information flowing from a source can be wrapped into logical views such that the interface in front of each view appears uniform. The logical views, however, can be assembled via a domain-ontology such as an integrated global schema. The mediator or wrapper, in turn, can serve as an intermediary or interface between observing end users and the source of information.

Once such source of information can include event data in a computing environment. Event data often can be generated natively or via adapters, through common base event generation. Alternatively, event data can be generated via crawling or extensive indexing of content in the computing system. In a given process in the computing system, however, it can be important to correctly identify relevant data according to a provided context such that the identified relevant data accordingly can be consumed by an appropriate consumer.

BRIEF SUMMARY OF THE INVENTION

Embodiments of the present invention address deficiencies of the art in respect to contextual mediation and provide a novel and non-obvious method, system and computer program product for an ontology driven contextual mediation. In one embodiment of the invention, a method for ontologically driving context mediation in a computing system can be provided. The method can include collecting events arising from a solution in a computing environment, loading operational meta-data for the solution, contextually mediating the collected events with the operational meta-data to produce context sensitive events, and correlating the context sensitive events with corresponding symptoms in a display to an end user in the computing environment.

In one aspect of the embodiment, collecting events arising from a solution in a computing environment can include collecting events arising from a solution in a computing environment, the events including both base events and also splunked events. In another aspect of the embodiment, loading operational meta-data for the solution, can include loading operational meta-data for the solution, the operational meta-data including a solution topology for the solution, workload patterns for the solution, and software configuration for applications provided as part of the solution.

In yet another aspect of the embodiment, contextually mediating the collected events with the operational meta-data to produce context sensitive events, can include context interchange (COIN) mediating the collected events with the operational meta-data to produce context sensitive events. Finally, in even yet another aspect of the embodiment, COIN mediating the collected events with the operational meta-data to produce context sensitive events can include COIN mediating the collected events with both the operational meta-data and a catalog of pre-defined symptoms to produce context sensitive events.

In another embodiment of the invention, an event correlation data processing system can be provided. The system can include an event collector collecting events from a solution in a computing system, a meta-data collector collecting meta-data for the solution, and a context mediator coupled to both collectors. The context mediator can include a COIN mediator and can be configured to applying semantic context to event using the meta-data in order to produce context sensitive events. The context mediator further can be configured to pass the context sensitive events to a correlation engine coupled to the context mediator. The correlation engine can associate the context sensitive events produced by the context mediator with pre-defined symptoms in a catalog. Optionally, the events can include both base events and also splunked events.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for an ontology driven contextual mediation. In accordance with an embodiment of the present invention, events collected for an enterprise computing system can be contextually mediated using a context interchange (COIN) mediator in order to resolve semantic conflicts between the different sources of the collected events. Pre-defined symptoms can be combined in the COIN mediation along with operational meta-data for the computing environment to provide the context for the collected events. Consequently, context sensitive events can be produced which can be correlated to the symptoms. In this way, the ontology of the computing environment can drive the contextual mediation of the collected events.

Figure 1:
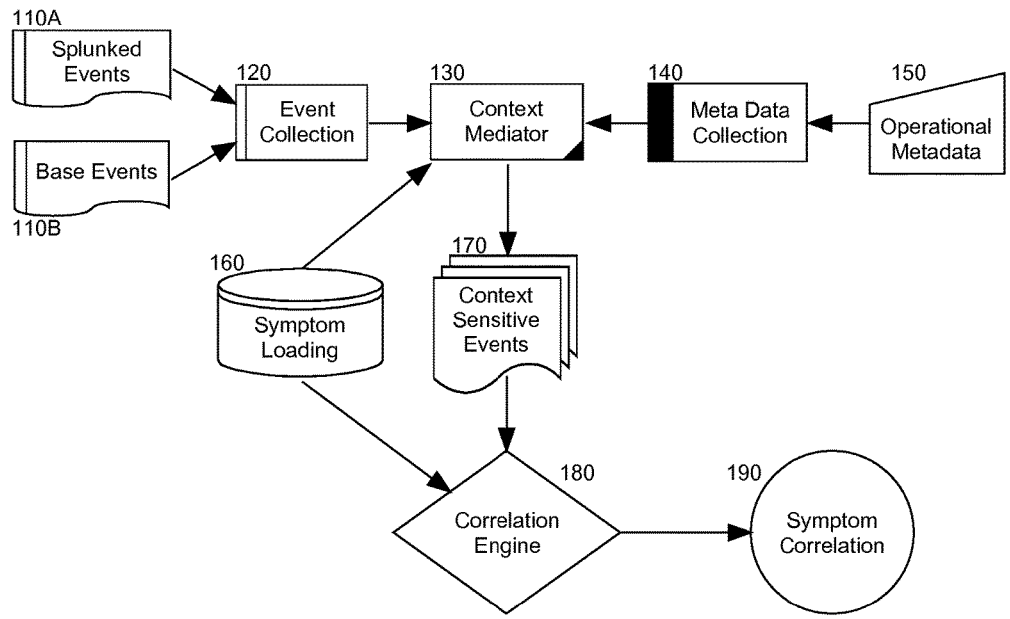
FIG. 1 is a schematic illustration of an event data processing system configured for an ontology driven contextual mediation; and, FIG. 2 is a flow chart illustrating a process for an ontology driven contextual mediation.

In further illustration, FIG. 1 schematically depicts an event data processing system configured for an ontology driven contextual mediation. The system can include an event collector 120. The event collector 120 can be configured to collect both splunked events 110A and base events 110B. The splunked events 110A can include those events acquired through crawling or indexing of logical components of a hosted computing architecture. The base events 110B, by comparison, can include those events generated natively through the operation of logical components of the hosted computing architecture, or via an adapter to the logical components of the hosted computing architecture.

The system also can include a context mediator 130 coupled to the event collector 120. The context mediator 130 can include a COIN mediator and can be configured to identify contextually relevant ones of the splunked events 110A and base events 110B provided by event collector 120. COIN mediators are well known in the art and are described in depth in Allen Moulton et al., *Context Interchange Mediation for Semantic Interoperability and Dynamic Integration of Autonomous Information Sources in the Fixed Income Securities Industry*, (WITS), Barcelona, Spain, Dec. 14-15, 2002, pp. 61-66.

The system yet further can include a meta-data collector 140. The meta-data collector 140 can be configured to collect operational meta-data 150 for the computing environment. In this regard, the operational meta-data 150 can include the solution topology for the computing environment, workload patterns for the solution, and software configuration for applications provided in the computing environment. Even yet further, a symptom catalog 160 can be coupled to the context mediator 130. The symptom catalog 160 can provide a lightweight ontology of pre-defined symptoms for the solution under analysis.

Consequently, the context mediator 130 further can be configured to apply semantic meaning to the splunked events 110A and base events 110B through a consideration of operational meta-data 150 provided by coupled meta-data collector 140 and symptoms expressed by the symptom catalog 160. The resultant context sensitive events 170 can be provided to a correlation engine 180. Utilizing the context of the context sensitive events 170, the correlation engine 180 can resolve the context sensitive events 170 into a symptom correlation 190 providing an association with corresponding pre-defined symptoms expressed by the symptom catalog 160.

Figure 2:
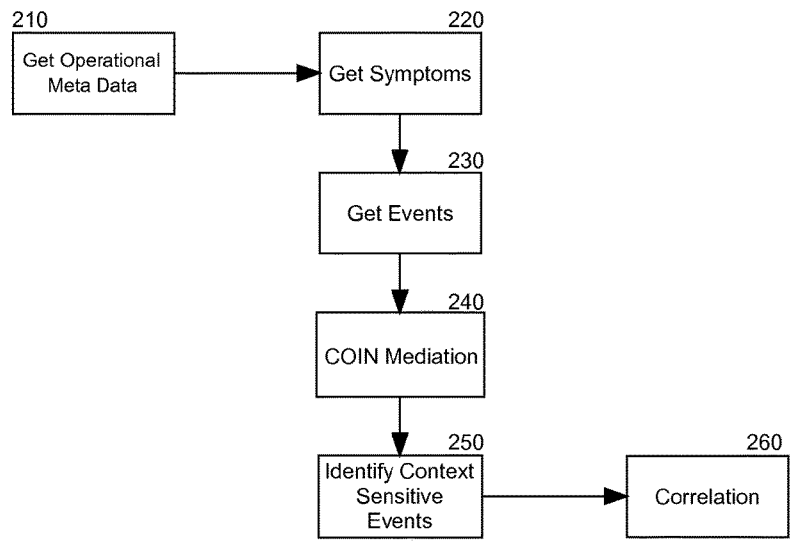

In yet further illustration, FIG. 2 is a flow chart illustrating a process for an ontology driven contextual mediation. The process can begin in block 210 with the retrieval of operational meta-data for a solution or solutions in a computing environment under analysis. In block 220, a catalog of pre-defined symptoms can be loaded for access. Thereafter, in block 230, one or more events can be collected. The events can include both splunked events and base events for one or more solutions in the computing environment.

In block 240, a COIN mediation can be applied to the collected events. The COIN mediation can apply both the operational meta-data and the pre-defined symptoms in order to determine semantic meaning for each of the collected events. Thereafter, in block 250 the context sensitive events for the collected events can be produced and passed to a correlation engine. Finally, in block 260, the context sensitive events can be associated with one or more of the loaded pre-defined symptoms and to present the same to an end user through a suitable user interface in order to facilitate an understanding of the origin of the context sensitive events.

In consequence of the ontologically driven contextual mediation of events described herein, events can be resolved into a symptom within the operational context of a contemporaneously deployed solution. Additionally, the underlying events need not be modified to achieve resolution due in large part to the use of operational meta-data to provide context for the events. Yet further, resolution of events can occur for product events, cross-product events, and solution specific events. Finally, the process described herein can be implemented both as an off-line process or an on-line process.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. A method for ontologically driving context mediation in a computing system, the method comprising:
    crawling or indexing of logical components of solution executing in a hosted computing architecture of a computing environment to acquire splunked events;
    collecting both the splunked events and also events generated natively through operation of logical components of the hosted computing architecture or via an adapter to the logical components of the hosted computing architecture;

loading a solution topology for the solution, workload patterns for the solution, and software configuration for applications provided as part of the solution;

contextually mediating the collected events with the solution topology for the solution, workload patterns for the solution, and software configuration for applications provided as part of the solution to produce context sensitive events by providing both the splunked events and the natively generated events to a context interchange (COIN) mediator, the COIN mediator producing context sensitive events by mediating the collected events with the loaded solution topology, workload patterns, and software configuration and also with a catalog of pre-defined symptoms; and, correlating the context sensitive events with corresponding symptoms in a display to an end user in the computing environment.

2. An event correlation data processing system comprising:

at least one processor coupled to a memory;

an event collector crawling or indexing of logical components of solution executing in a hosted computing architecture of a computing environment to acquire splunked events and collecting both the splunked events and also events generated natively through operation of logical components of the hosted computing architecture or via an adapter to the logical components of the hosted computing architecture;

a meta-data collector loading a solution topology for the solution, workload patterns for the solution, and software configuration for applications provided as part of the solution;

a context mediator coupled to both collectors, the context mediator contextually mediating the solution topology for the solution, workload patterns for the solution, and software configuration for applications provided as part of the solution to produce context sensitive events by providing both the splunked events and the natively generated events to a context interchange (COIN) mediator, the COIN mediator producing context sensitive events by mediating the collected events with the loaded solution topology, workload patterns, and software configuration and also with a catalog of pre-defined symptoms; and, a correlation engine coupled to the context mediator, the correlation engine associating context sensitive events produced by the context mediator with pre-defined symptoms in a catalog.

3. A computer program product comprising a non-transitory computer usable storage medium having stored therein computer usable program code for ontologically driving context mediation in a computing system, the computer program product comprising:

computer usable program code for crawling or indexing of logical components of solution executing in a hosted computing architecture of a computing environment to acquire splunked events;

computer usable program code for collecting both the splunked events and also events generated natively through operation of logical components of the hosted computing architecture or via an adapter to the logical components of the hosted computing architecture;

computer usable program code for loading a solution topology for the solution, workload patterns for the solution, and software configuration for applications provided as part of the solution;

computer usable program code for contextually mediating the collected events with the solution topology for the solution, workload patterns for the solution, and software configuration for applications provided as part of the solution to produce context sensitive events by providing both the splunked events and the natively generated events to a context interchange (COIN) mediator, the COIN mediator producing context sensitive events by mediating the collected events with the loaded solution topology, workload patterns, and software configuration and also with a catalog of pre-defined symptoms; and, computer usable program code for correlating the context sensitive events with corresponding symptoms in a display to an end user in the computing environment.

* * * * *